United States Patent [19]
Youmans et al.

[11] Patent Number: 6,018,390
[45] Date of Patent: Jan. 25, 2000

[54] INTEGRATED OPTICS WAVEGUIDE ACCELEROMETER WITH A PROOF MASS ADAPTED TO EXERT FORCE AGAINST THE OPTICAL WAVEGUIDE DURING ACCELERATION

[75] Inventors: Bruce Youmans, Sierra Vista, Ariz.; Victor Vali, Laguna Hills; Colleen Fitzpatrick, Fountain Valley, both of Calif.

[73] Assignee: Rice Systems, Inc., Irvine, Calif.

[21] Appl. No.: 09/014,111

[22] Filed: Jan. 27, 1998

[51] Int. Cl.[7] .................................................. G01B 9/02
[52] U.S. Cl. ..................... 356/345; 250/227.19; 385/12; 73/514.01
[58] Field of Search ....................... 356/345; 250/227.19, 250/227.27; 385/12, 14; 73/514.01

[56] References Cited

U.S. PATENT DOCUMENTS

| | | |
|---|---|---|
| 5,317,929 | 6/1994 | Brown et al. ........................ 73/514.01 |
| 5,485,402 | 1/1996 | Smith et al. . |
| 5,496,979 | 3/1996 | Behr . |
| 5,585,778 | 12/1996 | Brauer et al. . |
| 5,595,942 | 1/1997 | Albrecht et al. . |
| 5,611,731 | 3/1997 | Bouton et al. . |
| 5,615,132 | 3/1997 | Horton et al. . |
| 5,633,960 | 5/1997 | Lagakos et al. . |
| 5,684,298 | 11/1997 | O'Connor et al. . |

*Primary Examiner*—Samuel A. Turner
*Attorney, Agent, or Firm*—Price, Gess & Ubell

[57] ABSTRACT

A sensor, an optical accelerometer, which is sensitive enough for the measurement of nano-g's as well as thousands of g's. The sensor is created by an optical waveguide coil which is secured to a substrate. At one end of the waveguide coil, a mirror reflects the emitting light back into the waveguide coil. Positioned along one side of the substrate, a proof mass is adapted to exert force against and deform the optical waveguide coil during acceleration of the sensor. An identical optical waveguide coil is secured to the opposing side of the substrate with its associated proof mass positioned on the side of the substrate opposite the other side's proof mass. A beamsplitter communicates light into the ends of the two waveguide coils and then a monitor uses the light being emitted from the ends of the coils to measure the g's being applied.

24 Claims, 5 Drawing Sheets

INTEGRATED OPTICS WAVEGUIDE ACCELEROMETER WITH A PROOF MASS ADAPTED TO EXERT FORCE AGAINST THE OPTICAL WAVEGUIDE DURING ACCELERATION

BACKGROUND OF THE INVENTION

This invention relates generally to accelerometers and more particularly to accelerometers which employ light as their sensing mechanism.

The need for accelerometers is increasing as sensors increasingly need to recognize movement and make appropriate adjustments. Examples of apparatus which require or whose capabilities are enhanced by accelerometers include: robotics, automobile safety alarms, aircraft warning systems, satellite guidance systems, and guidance systems for munitions.

Acceleration is usually measured in "g's" where one-g is the acceleration created by gravity, or 9.80 meters per second per second.

As is clear from the examples where acceleration needs to be measured, the measured range is from a few nano-g's (i.e. satellite guidance) to several thousand g's (i.e. munitions guidance).

Several apparatus have been developed over the years in an effort to measure the acceleration of a variety of apparatus. In more recent years, the techniques have begun to utilize optics as a method of measuring acceleration. Optical accelerometers have an advantage in that they can be easily coupled with electronic circuits to provide dynamic control and monitoring systems.

To this end, a variety of instruments have been developed. In U.S. Pat. No. 5,684,298, entitled "Photonic-based Sensing Apparatus Using Displacement Tracking of an Optical Beam in a Semiconductor", issued Nov. 4, 1997, to O'Conner et. al, an optical beam is created which has a gap therein. Two electronic sensors monitor the gap which gives an indication of vibration (e.g. changes in the gap's characteristics).

In another approach to the problem, U.S. Pat. No. 5,633,960, entitled "Spatially Averaging Fiber Optic Accelerometer Sensors" issued May 27, 1997, to Lagakos, describes the use of a stress preventing layer which surrounds a center portion which has a higher Young's Modulus than the stress preventing layer. As the center portion deforms, an embedded fiber's characteristics alter, allowing the acceleration to be monitored and measured.

While these techniques do provide a level of measurement, each apparatus is highly restrictive as to the range of measurement and in it's applicability to either end of the spectrum which is to be measured. Neither apparatus, however configured, is able to measure in the nano-g range; and neither apparatus, however configured, is able to accurately measure and survive in the thousands of g range.

Further, many of these techniques are especially susceptible to electromagnetic interference which causes any readings to be suspect.

It is clear that there is a significant need to improve the sensitivity of accelerometers.

SUMMARY OF THE INVENTION

The present invention creates a sensor and optical accelerometer which is sensitive enough for the measurement of nano-g's as well as thousands of g's. In this regard, the apparatus of this invention has a general form which can be tailored during manufacture to meet the demands of the targeted application.

The sensor consists of an optical waveguide coil (either integrated onto the substrate by chemical vapor or an optical waveguide attached to the substrate) which is secured to a substrate. The substrate has a generally uniform consistency which, in the preferred embodiment, is a silicon wafer.

An optical waveguide is coiled and secured to the substrate. The waveguide is preferably secured using an overlay of either glass or plastic. The waveguide, in the preferred embodiment forms an optical waveguide coil with two ends.

At one end of the optical waveguide coil, a mirror reflects the light back into the coil. In this manner, the distance traveled by the light entering the optical waveguide coil is doubled since the light travels from a first end to a second, is reflected back to travel from the second end to the first end.

The doubling of the effective length of the optical waveguide coil provides for a higher sensitivity and also allows the sensor to be fabricated on a smaller substrate without requiring the reduction of radius of curves which would degrade the signal's strength.

Positioned on one side of the substrate, a proof mass is adapted to exert force against and deform the optical waveguide coil during acceleration. As the accelerometer accelerates, the proof mass exerts a force against the optical waveguide, the inertia of the proof mass tends to deform the optical waveguide coil and thereby change the waveguide coil's overall optical length.

The proof mass is positioned proximate to one side of the surface of the substrate.

It is through the selective choice of the mass of the proof mass that the sensor is able to address the wide range of g's contemplated. In the case where nano-g's are to be measured, then the mass of the proof mass would be "large", while in the situation where the sensor is to measure thousands of g's, the mass of the proof mass would be "small".

An identical optical waveguide coil is secured on the opposing side of the substrate with its proof mass positioned on an opposite side of the substrate. In this manner, the effects of acceleration on the proof masses are accentuated since the proof masses are on opposing sides and are complimentary to each other. That is, as the inertial force of one proof mass is pressing against its associated optical waveguide coil, the inertial force of the other proof mass is pulling away from its optical waveguide coil.

Utilizing these two interferometer arms, a beamsplitter couples light into the optical waveguide coils. In the preferred embodiment, the light is split substantially equally between the two interferometer arms.

The light entering each interferometer arm propagates the length of the optical waveguide coil, reflects back, and is received back by the beamsplitter which interferometrically combines the signal from both interferometer arms to a detector or monitor which analyzes the phase shift which has occurred to provide a reading of the g's being applied to the waveguide coils.

The output intensity of a Michelson interferometer is normally a cosine function. At small accelerations, the sensitivity of the detected pressure change would therefore be approximately zero. To maximize the sensitivity of the accelerometer to small pressure changes, it is necessary to operate the Michelson interferometer at its quadrature point. To do so, one of the interferometer arms must be made longer than the other by a quarter wavelength ($\pi/2$). This can be accomplished passively by establishing a physical pathlength difference or actively utilizing a means that changes the index of refraction of the waveguide, creating an optical path length change corresponding to an applied excitation. For the double pass case, where the light beam passes under the proof mass a second time, this pathlength difference corresponds to $\lambda/8$ (one-eighth of a wavelength). The output intensity function, now being a sine function, has maximum pressure sensitivity at small accelerations.

Within the following discussion, the application discussed for the invention is that of a sensor to measure satellite crosswinds and drag. Those of ordinary skill in the art readily recognize that the invention is not limited to this application alone.

In this application, the invention is capable of nano-g resolution along each of its three axes. The preferred embodiment of the invention has the following typical characteristics as an example, to meet the demands of the application of this discussion:

| | |
|---|---|
| Sensitivity | 4 ng |
| Peak Acceleration | 7 g |
| bandwidth | 0.05 Hz |
| Size | 10 cm × 10 cm × 10 cm |
| Weight | 2 kg |
| Power | 3 w |

In this embodiment of the invention, operation is based on an integrated optics interferometric pressure sensor. For reasons of temperature stability and ease of manufacture, a Michelson interferometer configuration is preferred. The light from the optical source is coupled into the integrated optics waveguide via a single mode optical fiber. Alternatively, the optical source can be placed on the substrate and coupled into the integrated optics waveguide directly. The light is then split into two equal intensity beams by a 3 dB beamsplitter. The two resulting light beams then propagate down each of the two sensing arms of the Michelson interferometer. At the end of each spiral waveguide is a mirror of high reflectivity which reflects the optical beams back again through each of the spirals.

The two beams are recombined at the 3 dB beamsplitter which now functions as a beamcombiner. Finally, the light is directed to a photodetector coupled to the end of the integrated optics waveguide.

For the sake of compactness, the sensing arms are configured in the shape of spirals, which are fabricated in exactly the same position only on opposite sides of the substrate. An advantage of this geometry is that a very long waveguide, and hence, a very sensitive interferometer, fits onto a smaller substrate without degrading the sensor's output sensitivity.

A "push-pull" configuration of the proof masses is created by positioning the proof masses on opposing sides of the substrate. Each proof mass exerts a force proportional to the acceleration; hence, pressure is applied to each optical waveguide.

If the device experiences an acceleration normal to the plane of the substrate, the pressure exerted on one waveguide by its corresponding proof mass increases, while pressure exerted on the other waveguide by the other proof mass decreases.

Note, the light beam propagating in the waveguide spiral passes through the spiral twice, once after being split by the beamsplitter, and then a second time after being reflected by the mirror. This results in an optical path length that is twice the geometric length of the spiral. This doubles the sensitivity of the apparatus.

In addition, the push-pull operation of the proof masses, as described above, introduces an additional factor of two to increase in the sensitivity of the sensor. This combined factor of four improvement in sensitivity permits the apparatus to achieve nano-g resolution with a small size and low weight.

Ideally, each proof mass is cylindrical, with a circular rim on the bottom which covers the band of waveguide turns. This concentrates the force exerted by each proof mass onto the small area occupied by the waveguide band to increase the pressure seen" by the interferometer.

The proof mass, positioned on the waveguide band is confined from lateral motion using flexures attached to the support structures. These flexures minimize sensitivity due to cross-axis accelerations, and friction, due to vertical movement. Alternative means would be to use small pyramid structures attached to the proof mass which make minimum point contact with the support structure, ball bearings, double ball bearings, impregnated metallic materials or viscous lubricating films.

In one embodiment of the invention, the proof masses are magnetically held in place; in another embodiment, the proof masses are spring loaded to apply a constant pressure against the optical waveguide.

In the application of this discussion, a satellite's drag and motion sensor, the output of the sensor of this invention is fed back to the satellite's navigation system, for real time orbit correction.

The apparatus utilizes the phase shift experienced during the deformation of the optical waveguide coil to gauge the acceleration being experienced.

The invention, together with various embodiments thereof will be more fully explained by the accompanying drawings and the following description.

DRAWINGS IN BRIEF

FIGS. 4A, 4B, 4C, and 4D are views of the preferred mechanism used to position the proof mass.

Figure 5:
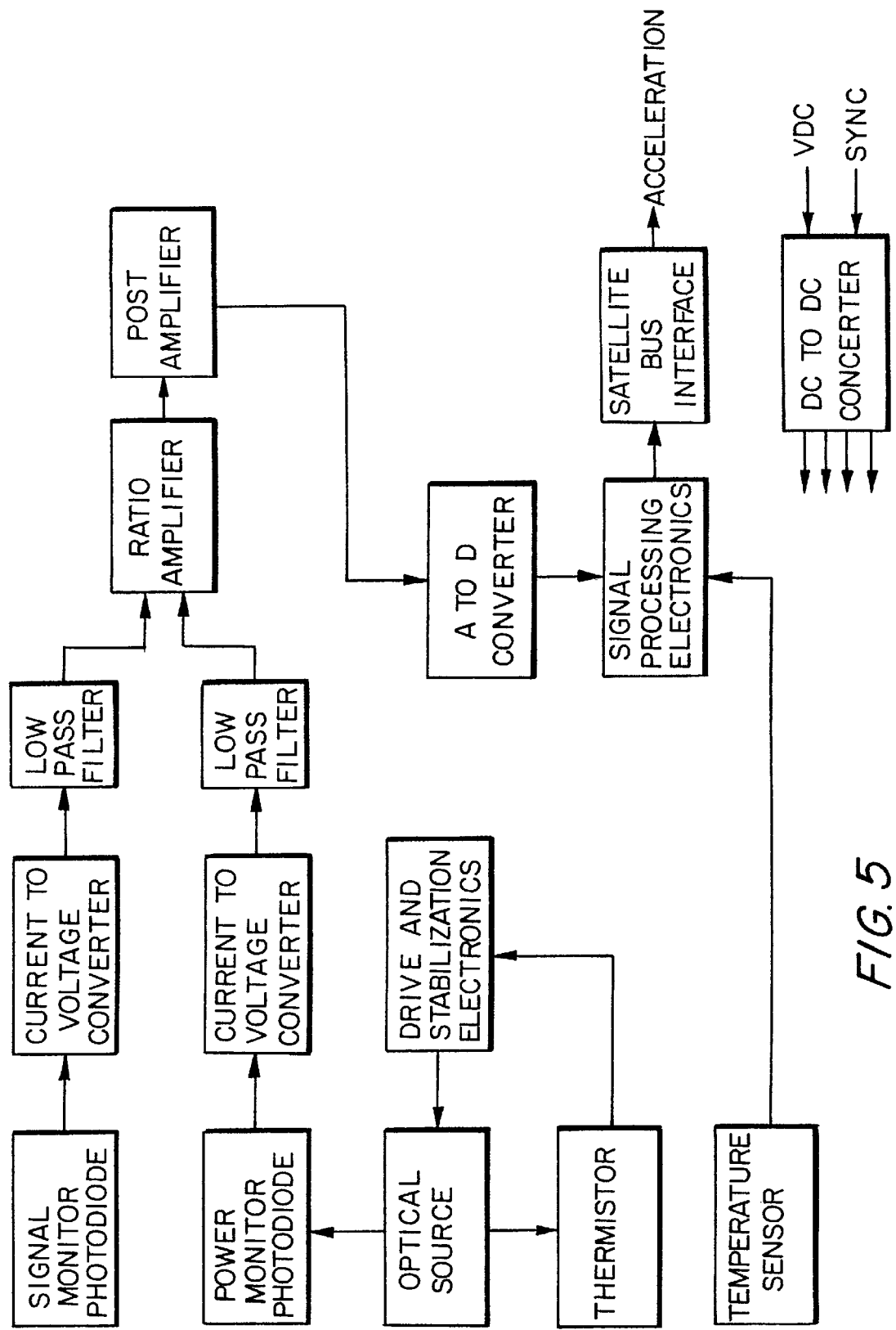

FIG. 5 is a block diagram of an embodiment of the electronic operation of the invention.

Figure 4A:
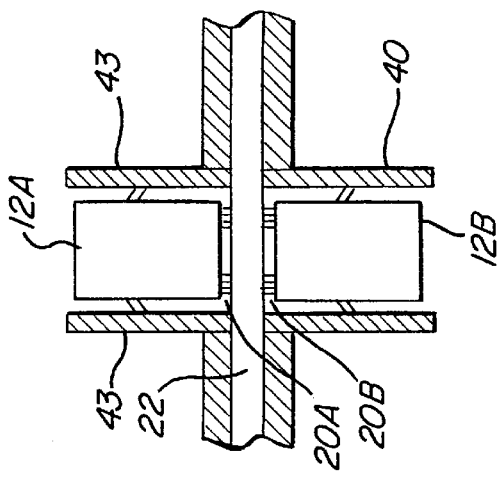
Figure 4B:
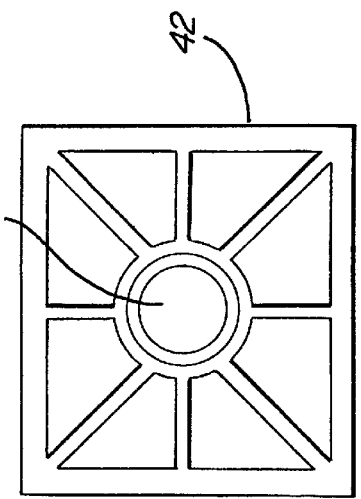
Figure 4C:
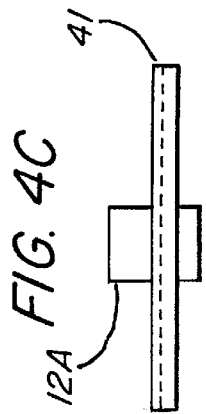
Figure 4D:
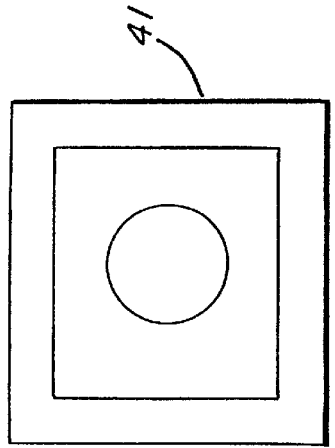
Figure 6:
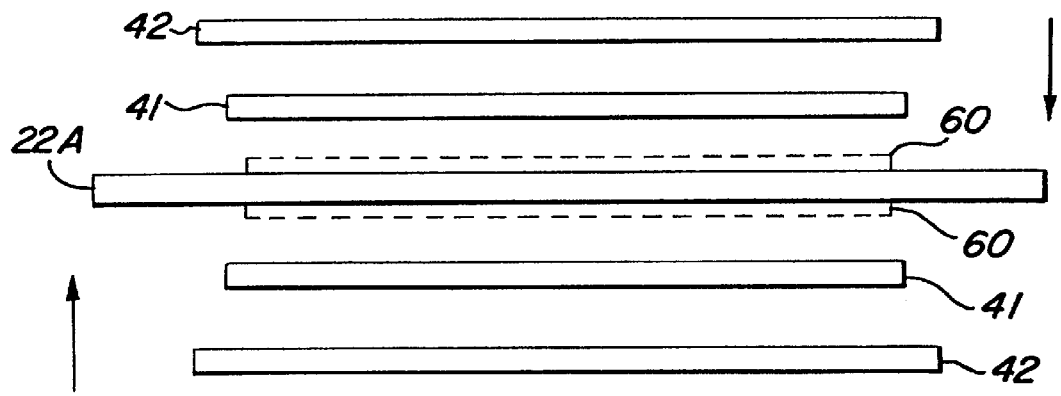

FIG. 6 is a side view of the preferred arrangement for the structural supports and shims first discussed in FIGS. 4A, 4B, and 4C.

Figure 7:
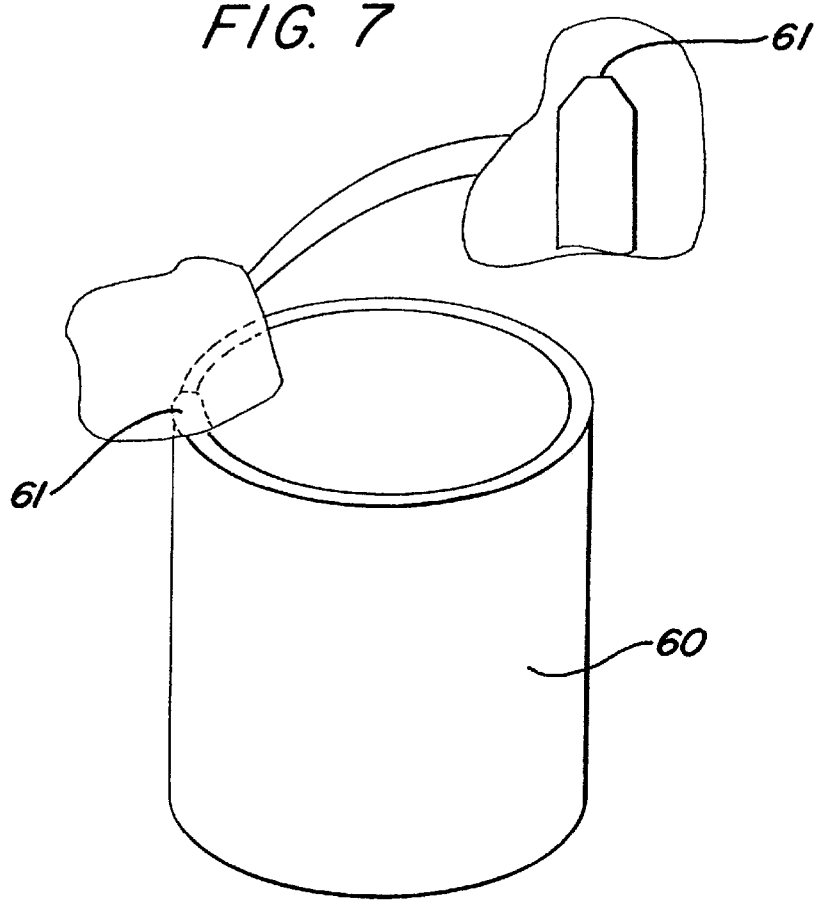

FIG. 7 is a perspective view of the preferred configuration for the proof mass.

DRAWINGS IN DETAIL

Figure 1:
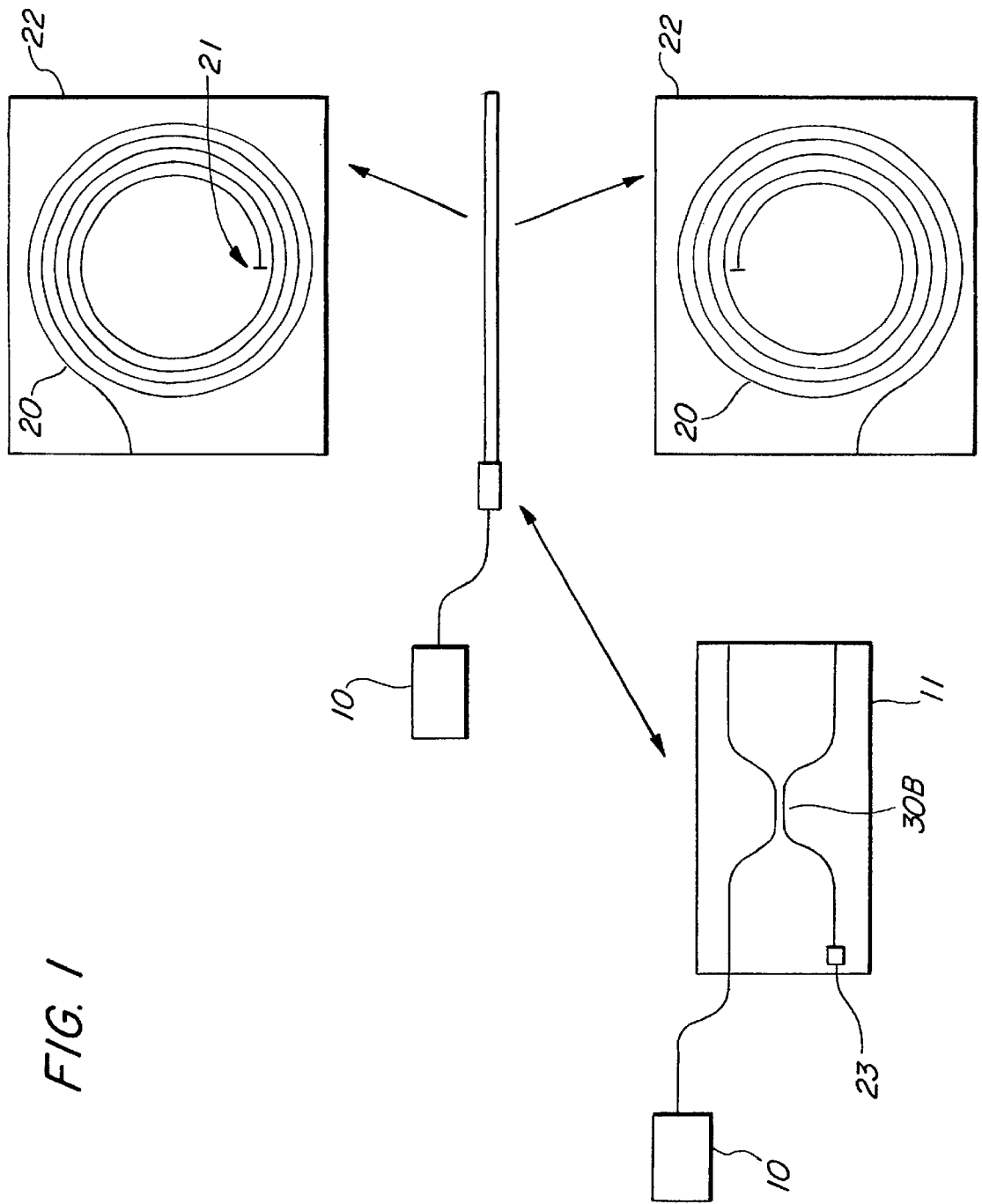
FIG. 1 is an operational diagram of the preferred embodiment of the invention.

FIG. 1 is an operational diagram of the preferred embodiment of the invention.

The light from optical source 10 is coupled into the integrated optics waveguide to beamsplitter 11 via a single mode optical fiber 12.

Beamsplitter 11 is preferably alighned at ninety degrees with respect to substrate 22 which has the optical waveguide coils 20 on opposite surfaces thereof. This configuration allows beamsplitter 11 to address both surfaces of substrate 22.

The two resulting light beams propagate down each of the two sensing arms of the Michelson interferometer. At the end of each spiral waveguide is mirror 21 of high reflectivity, ideally greater than ninety percent. Mirror 21 reflects the optical beams back through each of the spirals.

The two beams are recombined at beamsplitter 11, which now functions as a beamcombiner. Finally, the light is directed to an optical detector 23 coupled to the end of the integrated optics waveguide.

It should be noted that the light beam propagating in the waveguide spiral passes through the spiral twice, once after being split by the 3 dB beamsplitter 11, and then a second time after being reflected by mirror 21. This results in a optical path length that is twice the geometric length of the spiral. By doubling the optical path, the sensitivity of the apparatus is also doubled.

Figure 2:
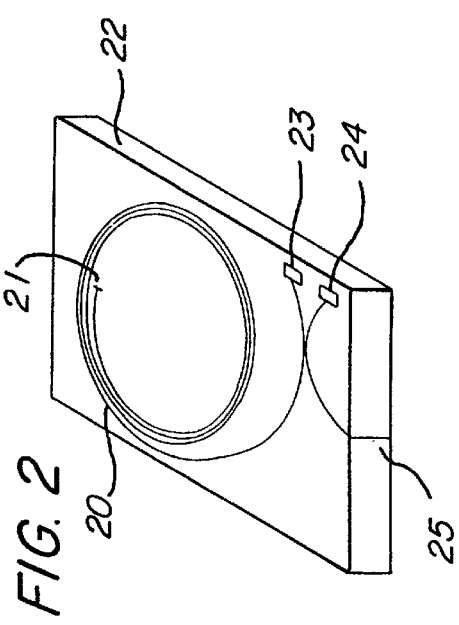
FIG. 2 is a perspective view of an alternative embodiment of the sensor of the invention.

FIG. 2 is a perspective view of an alternative embodiment of the sensor of the invention.

For the sake of compactness, the sensing arm 20 (the sensing arm on the opposing side is not visible from this angle) are configured in the shape of spirals. The two sensing arms are fabricated in exactly the same position on the silicon substrate 22 except that they are on opposing faces of substrate 22.

One advantage of this geometry (opposite sides of the same substrate) is that a very long waveguide, and hence, a very sensitive interferometer, fits onto a very small chip. Another advantage obtained by this configuration is that the spirals are located symmetrically on top of each other, thereby minimizing the thermal noise which the sensors may experience.

The embodiment shown in this figure places the interferometer on a dedicated substrate and creates connection pads (output detector 23 and source 24) permitting the light source and electronic circuitry to be mounted elsewhere.

Connector 25 communicates the light from a top side of the silicon substrate 22 to a rear plane for use by the sensing arm thereon.

It should be noted that the light beam propagating in the waveguide spiral passes through the spiral twice, once after being split by the beamsplitter, and then a second time after being reflected by the mirrors 21. The configuration of this invention uses the same optical path which is essentially "doubled" through the use of mirrors 21.

Figure 3:
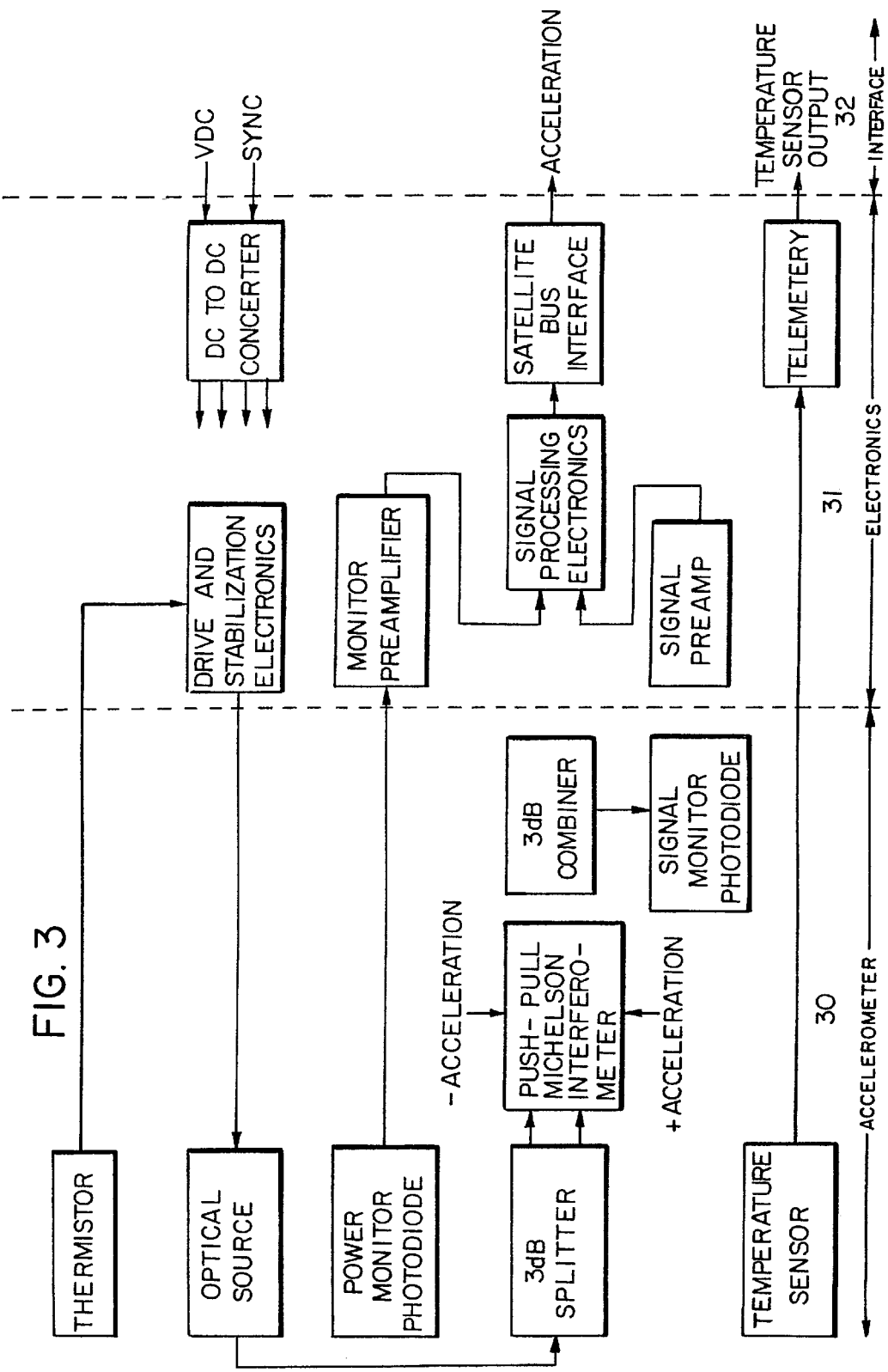
FIG. 3 is a functional block diagram of an embodiment of the invention.

FIG. 3 is a functional block diagram of an embodiment of the invention.

The functional block diagram for a single-axis of the invention is shown in FIG. 3. In this embodiment, there are three distinct parts: accelerometer 30, electronics 31, and interface 32.

The accelerometer portion 30 consists of the integrated optics assembly and a temperature sensor for monitoring the substrate's temperature. The temperature measurement is ideally used in the signal processing to minimize the scale factor temperature sensitivity.

The second portion consists of the electronics 31. This includes the optical source drive and stabilization circuitry as well as the signal processing electronics. Also included in the electronics 31 portion is the power conditioning and satellite bus interface circuitry.

The third portion of the functional block diagram is the satellite interface 32. This portion consists of the input signals which are provided to the apparatus from the satellite as well as output signals from the apparatus to the satellite processor. The input signal levels and output signal format are mission dependent and may vary depending on the application, satellite, or mission.

FIGS. 4A, 4B, and 4C are views of the preferred mechanism used to position the proof mass.

In this preferred configuration, proof mass 12A is positioned on top of the spiral waveguide 20A on each side of the silicon substrate 22. (In similar manner, proof mass 12B addresses sensing arm 20B). Each proof mass exerts a force proportional to the acceleration being experienced; this force results in pressure being applied to each optical waveguide.

If the device experiences an acceleration normal to the plane of substrate 22, the pressure exerted on one waveguide by its corresponding proof mass increases; while, at the same time, the pressure exerted on the other waveguide by the other proof mass decreases.

In the preferred embodiment, a TEFLON shim 41 is placed on both sides of substrate 22. Shim 41 provides a centering of the proof masses 12A and 12B, and support for the s-axis acceleration sensitivity.

In one embodiment of the invention, positioned on top of the proof masses are helical springs with a cylindrical cover over the entire proof mass assembly. The cover (not shown) allows the springs to apply an initial, zero acceleration loading of the proof mass to the waveguides 20A and 20B. The helical springs also provide a mechanical stop to prevent accelerations greater than maximum g-force from damaging the waveguides 20A and 20B.

In the preferred embodiment, each proof mass is cylindrical, with a circular rim on the bottom which just covers the band of waveguide turns. This concentrates the force exerted by each proof mass onto the small area occupied by the band, and greatly increases the pressure "seen" or experienced by the interferometer.

Ideally, the proof masses is magnetically held in place; other embodiments provide the spring loading of the proof masses.

Some candidate materials for the proof mass are:

| Material  | Density | Height | Push-Pull (nano-g's) |
|-----------|---------|--------|----------------------|
| Iron      | 7.9     | 3–5    | 4–2                  |
| Nickel    | 8.9     | 3      | 3                    |
| Palladium | 12.2    | 3      | 2                    |
| Tantalum  | 16.1    | 3–5    | 2–1                  |
| Tungsten  | 19.9    | 3      | 2                    |
| Platinum  | 21.4    | 3–5    | 1–<1                 |

FIG. 5 is a block diagram of an embodiment of the electronic operation of the invention.

Within this discussion, the application to satellite navigation is used as the application of choice; although the present invention is suitable for a wide range of applications, obvious to those of ordinary skill in the art.

Until now, satellite orbit correction due to these effects has been an ad hoc procedure, relying on ground-based satellite tracking stations data. As a result, a given satellite orbit is corrected with old information from previous orbits, which often is no longer valid.

On-board diagnostic instrumentation, as provided by this invention, correct this problem by providing real-time information on the cross wind and drag forces causing the satellite to deviate from its desired path.

The sensor and apparatus of this invention provides a diagnostic device capable of detecting forces at the nano-g level. The apparatus senses perturbations that result in orbital deviations, which are fed-back to the satellite's navigation system, for real time orbit correction.

The electronic module provides the interface between the apparatus and the satellite control system. The optical source of the interferometer is powered by a current source whose output level is controlled by a temperature sensor mounted on the source.

The light signal output from the interferometer is sensed by the optical detector (usually a photodiode) and is then fed to a high gain amplifier whose output is converted to a digital format by an A/D converter.

A second photodiode monitors the output of the source and is also amplified and converted to digital format with the same bit accuracy.

Fluctuations in the source output are subtracted by monitoring a small amount of light which originates from the source but does not pass through the interferometer. These fluctuations are combined as a ratio which is then digitized by the processor. This technique lowers the requirement on the stability of the light source, while maintaining the sensitivity of the apparatus.

Both input and output digital signals are processed in a micro-controller to compute the acceleration, and are then converted to RS422 format for output to the satellite control system. Digital processing is preferable over analog since changes in the acceleration algorithms are easily implemented through memory reprogramming, and additional error sources inherent in analog circuitry are avoided.

Passive and active components are ideally selected to meet the total dose radiation and single-event-upset requirements normally encountered.

FIG. 6 is a side view of the preferred arrangement for the structural supports and shims first discussed in FIGS. 4A, 4B, and 4C.

The sensor/substrate combination 22A has placed on the opposing sides sensor waveguides 60 (indicated by the dotted lines). On the opposing sides, the combination of the TEFLON shim 41 and the structural support 42 are secured to the sensor/substrate 22A. These two elements are secured to the sensor/substrate so that their associated proof mass will affect the interferometer sensing arms on their respective side of the substrate.

FIG. 7 is a perspective view of the preferred configuration for the proof mass. Note, in this illustration, the proof mass is inverted; that is, the portion that contacts and deforms the waveguide is at the top of the illustration.

In the preferred embodiment, proof mass 60 has a generally cylindrical shape with a circular rim 61 which protrudes to press against the waveguide and cause its deformation during acceleration.

It is clear from the foregoing that the present invention creates a highly versatile sensor for the measurement of acceleration forces.

What is claimed is:

1. An accelerometer comprising:
a) a substrate having a first planar side and a second planar side;
b) a first optical waveguide coil secured to the first planar side of said substrate, said first optical waveguide coil having a first end and a second end;
c) a first mirror positioned at the second end of said first optical waveguide coil and adapted to reflect light back into said first optical waveguide coil;
d) a second optical waveguide coil secured to the second planar side of said board member, said second optical waveguide coil having a first end and a second end;
e) a second mirror positioned at the second end of said second optical waveguide coil and adapted to reflect light back into said second waveguide optical coil;
f) a light source emitting light;
g) a beamsplitter receiving light from said light source and directing a fraction of said light into said first end of said first optical waveguide coil and directing a fraction of said light into said first end of said second optical waveguide coil;
h) an optical detector receiving combined light from said beamsplitter;
i) a first proof mass positioned on the first side of said substrate and adapted to exert a force against and deform a portion of said first optical waveguide coil;
j) a second proof mass positioned on the second side of said substrate and adapted to exert a force against and deform a portion of said second optical waveguide coil.

2. The accelerometer according to claim 1, wherein said beamsplitter splits said light substantially equally between the first end of said first optical waveguide coil and the first end of the second optical waveguide coil.

3. The accelerometer according to claim 2, further including:
a) a first guide member slidably securing the first proof mass against said first optical waveguide coil; and,
b) a second guide member slidably securing the second proof mass against said second optical waveguide coil.

4. The accelerometer according to claim 3,
a) wherein said first guide member is adapted to press said first proof mass against the first optical waveguide coil; and,
b) wherein said second guide member is adapted to press said second proof mass against the second optical waveguide coil.

5. An optical accelerometer comprising:
a) a sensing member having,
1) a substrate having a first planar side and a second planar side,
2) a first interferometer sensing arm secured to the first planar side of said substrate and having,
A) an optical waveguide coil having a first end and a second end,
B) a mirror positioned at the second end of said optical waveguide coil and adapted to reflect light back into said optical waveguide coil,
C) a proof mass adapted to exert a pressure force against and deform a portion of said optical waveguide coil during acceleration of said sensor;
3) a second interferometer sensing arm secured to the second planar side of said substrate and having,
A) an optical waveguide coil having a first end and a second end,
B) a mirror positioned at the second end of said optical waveguide coil and adapted to reflect light back into said optical waveguide coil,
C) a proof mass adapted to exert a pressure force against and deform a portion of said optical waveguide coil during acceleration of said sensor;
b) a beamsplitter adapted to
1) split light entering a first portal between the first end of the optical waveguide coil of the first interferometer sensing arm, and to the first end of the optical waveguide coil of the second interferometer sensing arm, and, 2) interfere light received from the first end of the optical waveguide coil of the first interferometer sensing arm and from the first end of the optical waveguide coil of the second interferometer sensing arm, to a second portal; and, c) a light source communicating light to said first portal of said beamsplitter.

6. The optical accelerometer according to claim 5, wherein said beamsplitter splits said light substantially equally between the first end of the optical waveguide coil of the first interferometer sensing arm and the first end of the optical waveguide coil of the second interferometer sensing arm.

7. The optical accelerometer according to claim 6, wherein said beamsplitter is secured to said substrate.

8. The optical accelerometer according to claim 5, further including an optical detector receiving light from the second portal of said beamsplitter and generating a signal representative of a phase change in received light.

9. The optical accelerometer according to claim 8, wherein said optical detector is secured to said substrate.

10. The optical accelerometer according to claim 8, wherein said light source is secured to said substrate.

11. The optical accelerometer according to claim 5, further including:
   a) a first guide member slidably securing the proof mass of said first sensor against the optical waveguide coil of said first interferometer sensing arm; and,
   b) a second guide member slidably securing the proof mass of said second sensor against the optical waveguide coil of said second interferometer sensing arm.

12. The optical accelerometer according to claim 11,
   a) wherein said first guide member presses the proof mass of said first sensor against the optical waveguide coil of the first interferometer sensing arm; and,
   b) wherein said second guide member presses the proof mass of said second sensor against the optical waveguide coil of the second interferometer sensing arm.

13. The optical accelerometer according to claim 5, further including:
   a) an output port adapted to communicate light from the second end of the optical waveguide coil of said first interferometer sensing arm to an apparatus external to said substrate; and,
   b) an output port adapted to communicate light from the second end of the optical waveguide coil of said second interferometer sensing arm to an apparatus external to said substrate.

14. An accelerometer sensor comprising:
   a) a substrate member; and,
   b) a first interferometer sensing arm secured to a first planar side of said substrate member and having,
      1) an optical waveguide coil having a first end and a second end,
      2) a mirror positioned at the second end of said optical waveguide coil and adapted to reflect emitting light back into said optical waveguide coil, and,
      3) a first proof mass adapted to exert a pressure force against and deform a portion of said optical waveguide coil during acceleration of said sensor.

15. The sensor according to claim 14, further including a second interferometer sensing arm secured to a second planar side of said substrate member having:
   a) an optical waveguide coil having a first end and a second end;
   b) a mirror positioned at the second end of said optical waveguide coil and adapted to reflect light back into said optical waveguide coil; and,
   c) a second proof mass adapted to exert a pressure force against and deform a portion of said optical waveguide coil during acceleration of said sensor.

16. The sensor according to claim 15, wherein a difference between a length of said first interferometer sensing arm and a length of the second interferometer sensing arm is approximately one-eighth a wavelength.

17. The sensor according to claim 15, further including a beamsplitter secured to said substrate and adapted to:
   a) split light entering a first portal thereof between the first end of the optical waveguide coil of the first interferometer sensing arm, and the first end of the optical waveguide coil of the second interferometer sensing arm; and,
   b) communicate light received from the first end of the optical waveguide coil of the first interferometer sensing arm and from the first end of the optical waveguide coil of the second interferometer sensing arm, to a second portal of said beamsplitter.

18. The sensor according to claim 17, further including a light source communicating light to said first portal of said beamsplitter.

19. The sensor according to claim 17, wherein said beam-splitter splits said light substantially equally between the first end of the optical waveguide coil of the first interferometer sensing arm and the first end of the optical waveguide coil of the second interferometer sensing arm.

20. The sensor according to claim 17, further including an optical detector receiving light from the second portal of said beamsplitter and generating a signal representative of a phase change in received light.

21. The sensor according to claim 17, further including:
   a) a first mass guide slidably securing the first proof mass against the optical waveguide coil of said first interferometer sensing arm; and,
   b) a second mass guide slidably securing the second proof mass against said optical waveguide coil of said second interferometer sensing arm.

22. The sensor according to claim 21, wherein said first mass guide and said second mass guide are adapted to apply force to the first and second proof mass to engage the first and second optical waveguide coil respectively.

23. The sensor according to claim 14, further including:
   a) an input port adapted to receive light from an external source and communicate light to said first end of said optical waveguide coil of said first interferometer sensing arm; and,
   b) an output port adapted to communicate light from the second end of said optical waveguide coil of said first interferometer sensing arm to an apparatus external to said substrate member.

24. The sensor according to claim 15, further including:
   a) an input port adapted to receive light from an external source and communicate light to the first end of said optical waveguide coil of said second interferometer sensing arm; and,
   b) an output port adapted to communicate light from the second end of said optical waveguide coil of said second interferometer sensing arm to an apparatus external to said substrate member.

* * * * *